United States Patent
Gong (10) Patent No.: US 9,368,979 B2
(45) Date of Patent: Jun. 14, 2016

(54) SYSTEM AND METHODS FOR BATTERY BALANCING

(71) Applicant: O2Micro Inc., Santa Clara, CA (US)

(72) Inventor: Xiaofei Gong, Shanghai (CN)

(73) Assignee: O2Micro Inc, Santa Clara, CA (US)

( * ) Notice: Subject to any disclaimer, the term of this patent is extended or adjusted under 35 U.S.C. 154(b) by 383 days.

(21) Appl. No.: 13/835,899

(22) Filed: Mar. 15, 2013

(65) Prior Publication Data

US 2014/0266072 A1 Sep. 18, 2014

(51) Int. Cl.
*H02J 7/00* (2006.01)
*H02J 7/14* (2006.01)
*B60L 11/18* (2006.01)

(52) U.S. Cl.
CPC ............ *H02J 7/0016* (2013.01); *H02J 7/0014* (2013.01); *H02J 7/0021* (2013.01); *B60L 11/1866* (2013.01); *H02J 7/0031* (2013.01)

(58) Field of Classification Search
USPC ......... 320/116, 118, 119, 104, 122, 124, 134, 320/101, 117, 120, 132, 135, 136, 148, 162, 320/164
See application file for complete search history.

(56) References Cited

U.S. PATENT DOCUMENTS

| | | | |
|---|---|---|---|
| 5,493,197 A * | 2/1996 | Eguchi et al. | 320/116 |
| 6,157,165 A | 12/2000 | Kinoshita et al. | |
| 6,700,766 B2 * | 3/2004 | Sato | 361/93.1 |
| 7,973,515 B2 | 7/2011 | Densham et al. | |
| 8,207,703 B2 * | 6/2012 | Kurose et al. | 320/116 |
| 8,232,773 B2 * | 7/2012 | Denning et al. | 320/134 |
| 8,288,999 B2 | 10/2012 | Hsu et al. | |
| 8,299,755 B2 | 10/2012 | Shiu et al. | |
| 8,410,754 B2 | 4/2013 | Ciampolini | |
| 2007/0268000 A1 * | 11/2007 | Kobayashi et al. | 320/118 |
| 2008/0088277 A1 * | 4/2008 | Wang et al. | 320/119 |
| 2009/0096420 A1 * | 4/2009 | Lupu et al. | 320/122 |
| 2010/0023285 A1 * | 1/2010 | Nakanishi | 702/63 |
| 2010/0253278 A1 * | 10/2010 | Chang | B60K 16/00 320/101 |
| 2010/0264878 A1 * | 10/2010 | Ueda et al. | 320/116 |
| 2010/0321025 A1 * | 12/2010 | Lin et al. | 324/427 |
| 2011/0011653 A1 * | 1/2011 | Mizutani et al. | 180/65.1 |
| 2012/0242344 A1 * | 9/2012 | Ishishita | B60L 3/0046 324/430 |

FOREIGN PATENT DOCUMENTS

| | | |
|---|---|---|
| CN | 101692506 A | 4/2010 |
| CN | 102157975 A | 8/2011 |
| CN | 102222805 A | 10/2011 |
| EP | 0851556 A2 | 7/1998 |
| TW | 472426 B | 1/2002 |
| TW | 200919900 A | 5/2009 |
| TW | 201008077 A | 2/2010 |

* cited by examiner

*Primary Examiner* — Alexis A Boateng (57) ABSTRACT

A battery system includes multiple battery cells having multiple cell voltages, and a balancing module. The battery module coupled to multiple battery cells and configured to specify a first voltage threshold according to an amount of a charging current supplied to the battery cells in constant current charging mode, and to initiate a balance check of the battery cells if the first voltage threshold is not satisfied by a cell voltage of the plurality of cell voltages.

21 Claims, 7 Drawing Sheets

SYSTEM AND METHODS FOR BATTERY BALANCING

BACKGROUND

A battery system includes battery cells, e.g., Lithium ion cells, for powering cell phones, laptop computers or electric vehicle. A battery balancer is widely used to maximize the capacity of the battery cells and increase the battery's lifetime. If the battery cells experience an unbalanced condition, then the battery balancer balances the battery cells by drawing energy from the most charged cell or by drawing energy from the most charged cell to the least charged cell.

Figure 1:
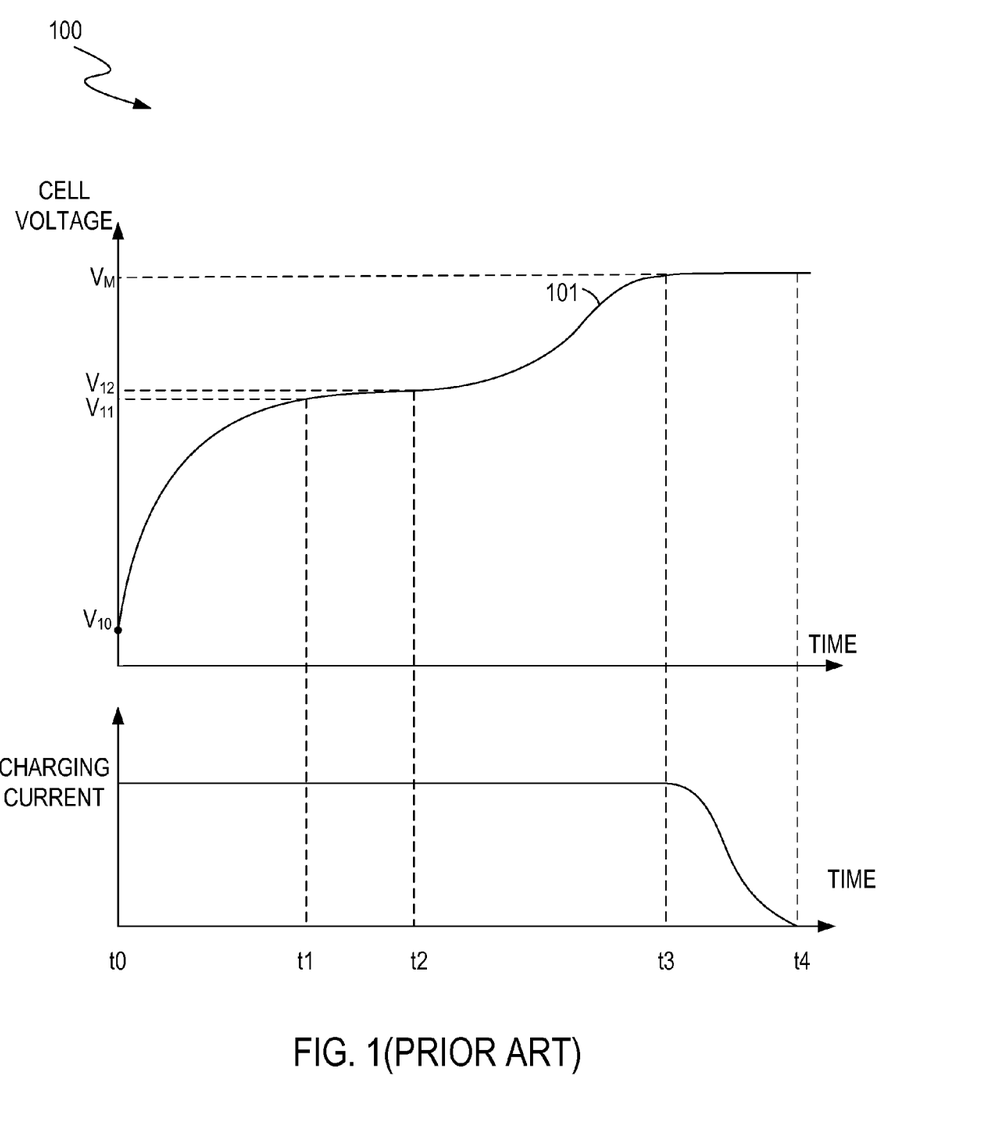
FIG. 1 shows waveforms of a cell voltage and a charging current associated with a Lithium ion battery cell during charging.

FIG. 1 shows waveforms 100 of a cell voltage and a charging current associated with a Lithium ion battery cell during charging. The Lithium ion battery cell is charged in multiple charging modes such as a constant current (CC) charging mode and a constant voltage (CV) charging mode. At time t0, the Lithium ion battery cell has a voltage level $V_{10}$, and a charging current is provided to charge the battery cell. During the time interval between t0 and t3, the battery cell operates in the constant current mode in which the charging current is constant and the voltage increases from the level $V_{10}$ to the level $V_M$. During the time interval between t3 and t4, the battery cell enters a constant voltage mode in which the charging current gradually decreases and the cell voltage is maintained at a constant level. For example, the voltage level of the battery cell is maintained at $V_M$ during time t3 and time t4. At time t4, the charging current decreases below a current threshold. In response, the battery charging is terminated.

During the constant current charging mode, there is a time period in which the cell voltage rises at a relatively low rate (the time period is called a flat voltage region hereinafter). For example, the rising rate of the cell voltage between t1 and t2 is less than a rate threshold. As the charging current is constant, the rate at which the capacity of the battery cell increases is supposed to be the same at any time in the constant current mode. Thus, the cell voltage in the flat voltage region, e.g., having a relatively low rising rate, does not accurately reflect the variation in the cell capacity.

Therefore, for a battery pack that includes multiple battery cells, the battery balancer may perform the balancing operation when all the battery cells operate in the flat voltage region. Since the cell voltages do not reflect the capacity of a battery cell, it is a challenge for the battery balancer to detect whether the unbalanced condition is corrected by monitoring the cell voltages of the battery cells. For example, although energy of the most charged cell is drawn to the least charged cell during balancing, the voltages of the cells do not vary in response to the variation of cell capacities. Thus, the balancing control of the battery balancer may not be accurate.

SUMMARY

In one embodiment, a battery system includes multiple battery cells having multiple cell voltages, and a balancing module. The battery module coupled to multiple battery cells and configured to specify a first voltage threshold according to an amount of a charging current supplied to the battery cells in constant current charging mode, and to initiate a balance check of the battery cells if the first voltage threshold is not satisfied by a cell voltage of the plurality of cell voltages.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "specifying," "initiating," "comparing," "selecting," "setting," "balancing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of machine- or computer-executable instructions residing on some form of machine- or computer-readable storage medium, such as program modules, executed by one or more computers or other devices. By way of example, and not limitation, machine/computer-readable storage media may comprise non-transitory machine/computer-readable storage media and communication media; non-transitory machine/computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Non-transitory machine/computer storage media includes volatile and nonvolatile, removable and non-removable media implemented in any method or technology for storage of information such as machine/computer-readable instructions, data structures, program modules or other data. Machine/computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody machine/computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of machine/computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2:
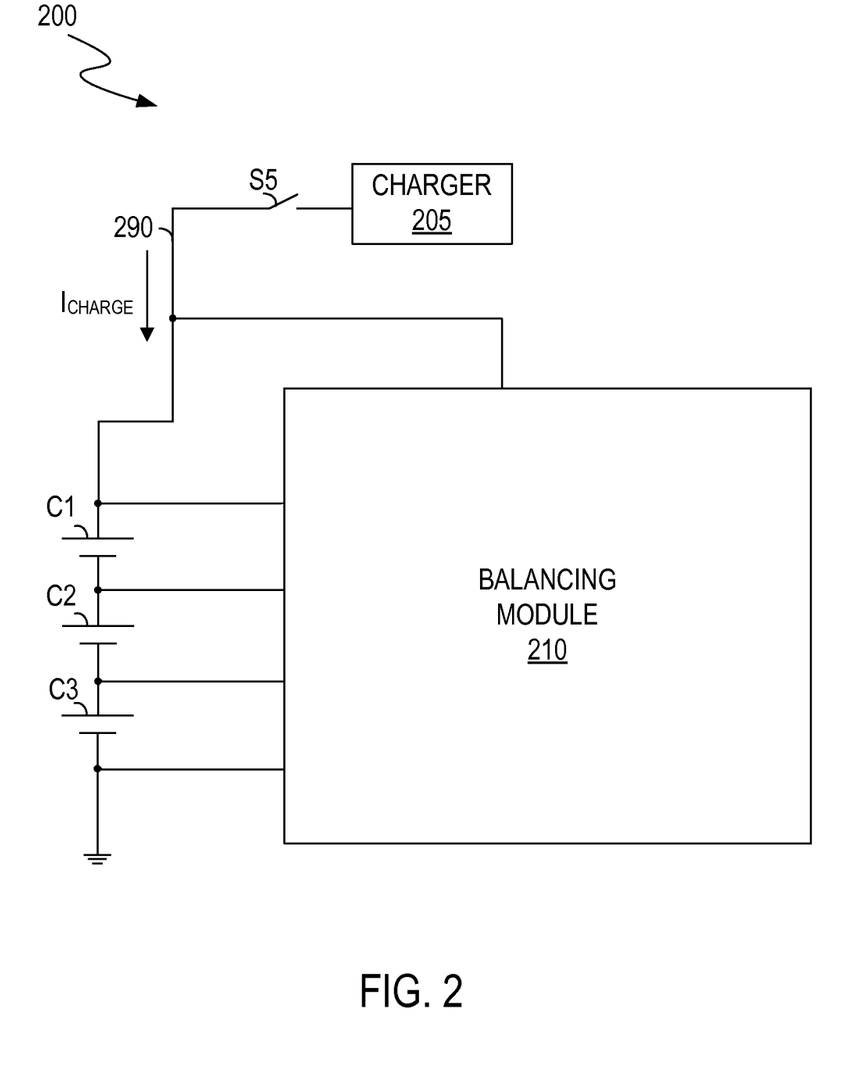
FIG. 2 illustrates a block diagram of a battery system, in an embodiment according to the present invention.

FIG. 2 illustrates a block diagram of a battery system 200, in an embodiment according to the present invention. The battery system 200 includes battery cells C1, C2, and C3, and a balancing module 210. Although three battery cells are shown in the example of FIG. 2, some other number of battery cells can be included in the battery system 200. The battery cells C1-C3 can be Lithium ion battery cells, in one embodiment. The battery cells C1-C3 are coupled to the balancing module 210. The balancing module 210 is operable for monitoring cell parameters (e.g., cell voltage, cell current, cell temperature, and cell capacity) of each individual cell C1-C3, and determining whether the battery cells C1-C3 experience an unbalanced condition. The balancing module 210 balances the battery cells if an unbalanced condition is detected.

In one embodiment, the battery cells C1-C3 are coupled to a charger 205 via a charging path 290 having a switch S5. When the switch S5 is turned on, the battery cells C1-C3 operate in a charging mode (e.g., a constant current charging mode or the constant voltage charging mode), in which the charger 205 charges the battery cells C1-C3 with a charging current $I_{CHARGE}$. When the switch S5 is turned off or the charger 205 is decoupled from the battery cells C1-C3, the battery cells C1-C3 operate in an idle mode or in a discharging mode, in which the charging operation is terminated.

Figure 3:
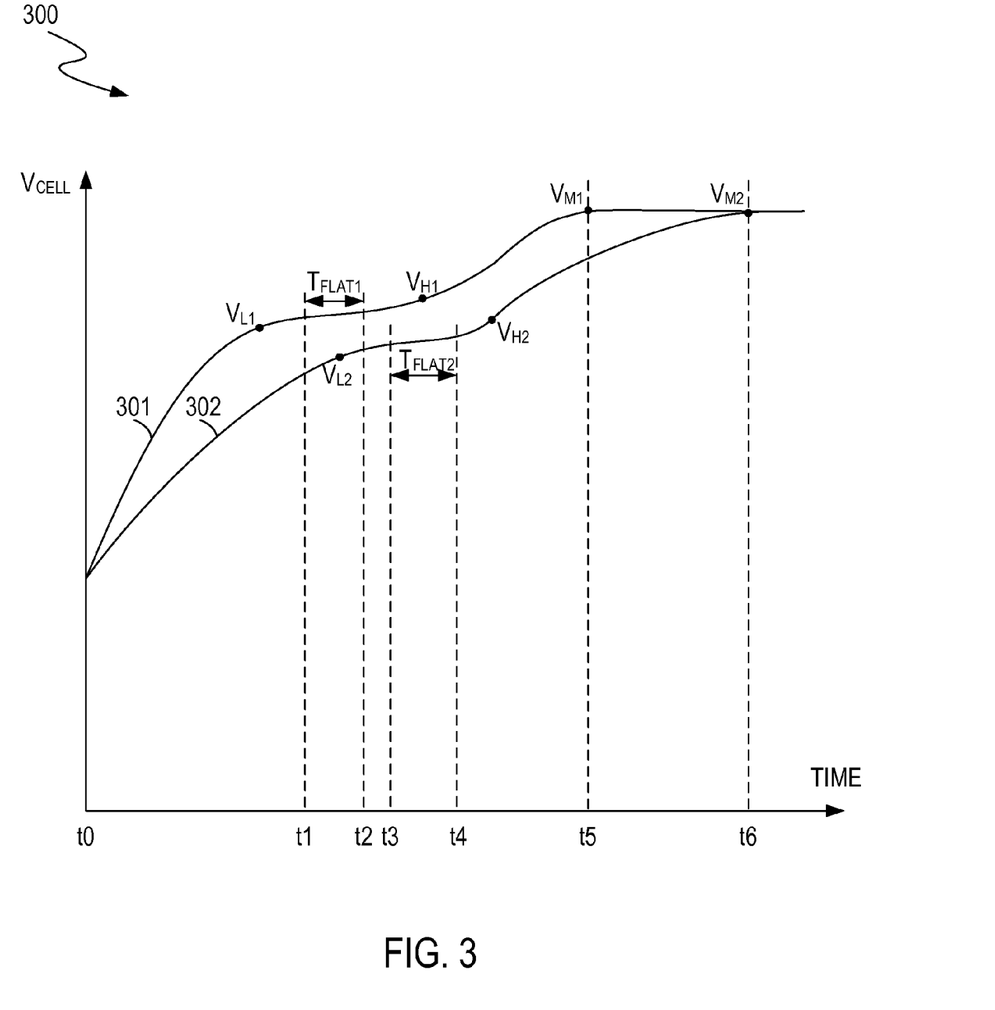
FIG. 3 shows a waveform illustrating a cell voltage of a battery cell during charging, in an embodiment according to the present invention.

FIG. 3 shows a waveform 300 illustrating a cell voltage $V_{CELL}$ of a battery cell during charging, in an embodiment according to the present invention. FIG. 3 is described in combination with FIG. 2.

As shown in the example of FIG. 3, the waveform 300 includes a curve 301 and a curve 302. The curve 301 represents predicted variations of the cell voltage $V_{CELL}$ when the battery cell is charged by a charging current $I_{CHARGE1}$. The curve 302 represents predicted variations of the cell voltage $V_{CELL}$ when the battery cell is charged by a charging current $I_{CHARGE2}$. In one embodiment, the charging current $I_{CHARGE1}$ is greater than the charging current $I_{CHARGE2}$. Even though two charging curves are shown in FIG. 3, other charging curves corresponding to other charging currents can be included in FIG. 3. In one embodiment, these curves are provided by the battery's manufacturer.

More specifically, in one embodiment, if the associated battery cell is charged by the charging current $I_{CHARGE1}$, e.g., the curve 301, the battery cell operates in the constant current mode during the time interval between t0 and t5, and operates in the constant voltage mode after time t5. In the constant current mode, the charging current $I_{CHARGE1}$ stays the same, and the cell voltage increases. In the constant voltage mode, the cell voltage remains at $V_M$, and the charging current $I_{CHARGE1}$ decreases. As shown in the example of FIG. 3, the curve 301 has a flat voltage region $T_{FLAT1}$ between t1 and t2, during which the rate of increase (the "increasing rate") of the cell voltage is less than a rate threshold. Likewise, if the battery cell is charged by the charging current $I_{CHARGE2}$, e.g., the curve 302, the battery cell operates in the constant current mode during the time interval between t0 and t6, and operates in the constant voltage mode after time t6. The curve 302 has a flat voltage region $T_{FLAT2}$ between t3 and t4.

Refer to both FIG. 2 and FIG. 3, the balancing module 210 is capable of checking whether the battery cells C1-C3 are in an unbalanced condition, and of balancing the battery cells C1-C3 if an unbalanced condition is detected. Advantageously, the balancing module 210 initiates the balancing operation when at least one of the battery cells operates outside of the flat voltage region. More specifically, in one embodiment, the balancing module 210 provides a voltage threshold $V_H$ that is greater than a maximum cell voltage of a battery cell operating in the flat voltage region. For example, if the battery cells are charged by the charging current $I_{CHARGE1}$, the voltage threshold $V_H$ is greater than the cell voltage at time t2 according to the curve 301.

If one or more cell voltages $V_{C1}$-$V_{C3}$ are greater than the voltage threshold $V_H$, indicating that one or more battery cells is operating outside of the flat voltage region, then the balancing module 210 starts to check the cell voltages and balances the battery cells C1-C3 if an unbalanced condition is detected. By way of example, the balancing module 210 compares a maximum cell voltage $V_{MAX}$ among the battery cells C1-C3 to a minimum cell voltage $V_{MIN}$ among the battery cells C1-C3. An unbalanced condition occurs if a difference between the maximum cell voltage $V_{MAX}$ and the minimum cell voltage $V_{MIN}$ is greater than a threshold $V_{DIF}$. In response to the unbalanced condition, the balancing module 210 balances the battery cells C1-C3. For example, the balancing module 210 identifies a battery cell $C_{MAX}$ having a maximum cell voltage $V_{MAX}$, and balances the battery cells by consuming energy stored in the battery cell $C_{MAX}$. Alternatively, the balancing module 210 further identifies a battery cell $C_{MIN}$ having a minimum cell voltage $V_{MIN}$, and balances the battery cells by transferring energy from the battery cell $C_{MAX}$ to the battery cell $C_{MIN}$. The balancing module 210 is capable of performing other operations to check for an unbalanced condition and to balance the battery cells, and is not limited to the example of FIG. 3.

Advantageously, the balancing module 210 specifies the voltage threshold $V_H$ according to the charging current. Also, the voltage threshold $V_H$ is greater than a maximum cell voltage of a battery cell operating in the flat voltage region. As shown in FIG. 3, a cell voltage in the flat voltage region of the curve 301 is greater than that in the flat voltage region of the curve 302. The balancing module 210 sets the voltage threshold $V_H$ to a level $V_{H1}$ if the battery cell is charged by the current $I_{CHARGE1}$, and sets the voltage threshold $V_H$ to a level $V_{H2}$ if the battery cell is charged by the current $I_{CHARGE2}$. In other words, the voltage threshold $V_H$ varies according to the charging current flowing through the battery cells C1-C3. Consequently, even if the flat voltage region is shifted according to the charging current, the battery balancing would not be performed until at least one of the battery cells C1-C3 operates outside of the flat range. As such, the control of the battery balancing is more accurate.

In yet another embodiment, the balancing module 210 provides a voltage threshold $V_L$ that is less than a minimum cell voltage of a battery cell operating in the flat voltage region. The voltage threshold $V_L$ is selected according to the charging current. For example, if the battery cells are charged by the charging current $I_{CHARGE1}$, the voltage threshold $V_L$ is less than the cell voltage at time t1 according to the curve 301. The voltage threshold $V_L$ is set to $V_{L1}$ if the battery cell is charged by the current $I_{CHARGE1}$, and is set to $V_{L2}$ if the battery cell is charged by the current $I_{CHARGE2}$. In this instance, the balancing module 210 performs the balancing operation if at least one of the cell voltages $V_{C1}$-$V_{C3}$ is less than the voltage threshold $V_L$.

In yet another embodiment, the balancing module 210 provides both the voltage threshold $V_H$ and the voltage threshold $V_L$. For example, when the battery cells are charged by the current $I_{CHARGE1}$, the voltage threshold $V_H$ is set to $V_{H1}$ and the voltage threshold $V_L$ is set to $V_{L1}$. When the battery cells are charged by the current $I_{CHARGE2}$, the voltage threshold $V_H$ is set to $V_{H2}$ and the voltage threshold $V_L$ is set to $V_{L2}$. Then, the balancing module 210 performs the balancing operation if at least one of the cell voltages $V_{C1}$-$V_{C3}$ is greater than the voltage threshold $V_H$ or less than the voltage threshold $V_L$.

Advantageously, in all three of the circumstances above, the battery balancing can be performed when one or more of the battery cells operates outside of the flat range. As such, the control of the battery balancing is more accurate.

Figure 4:
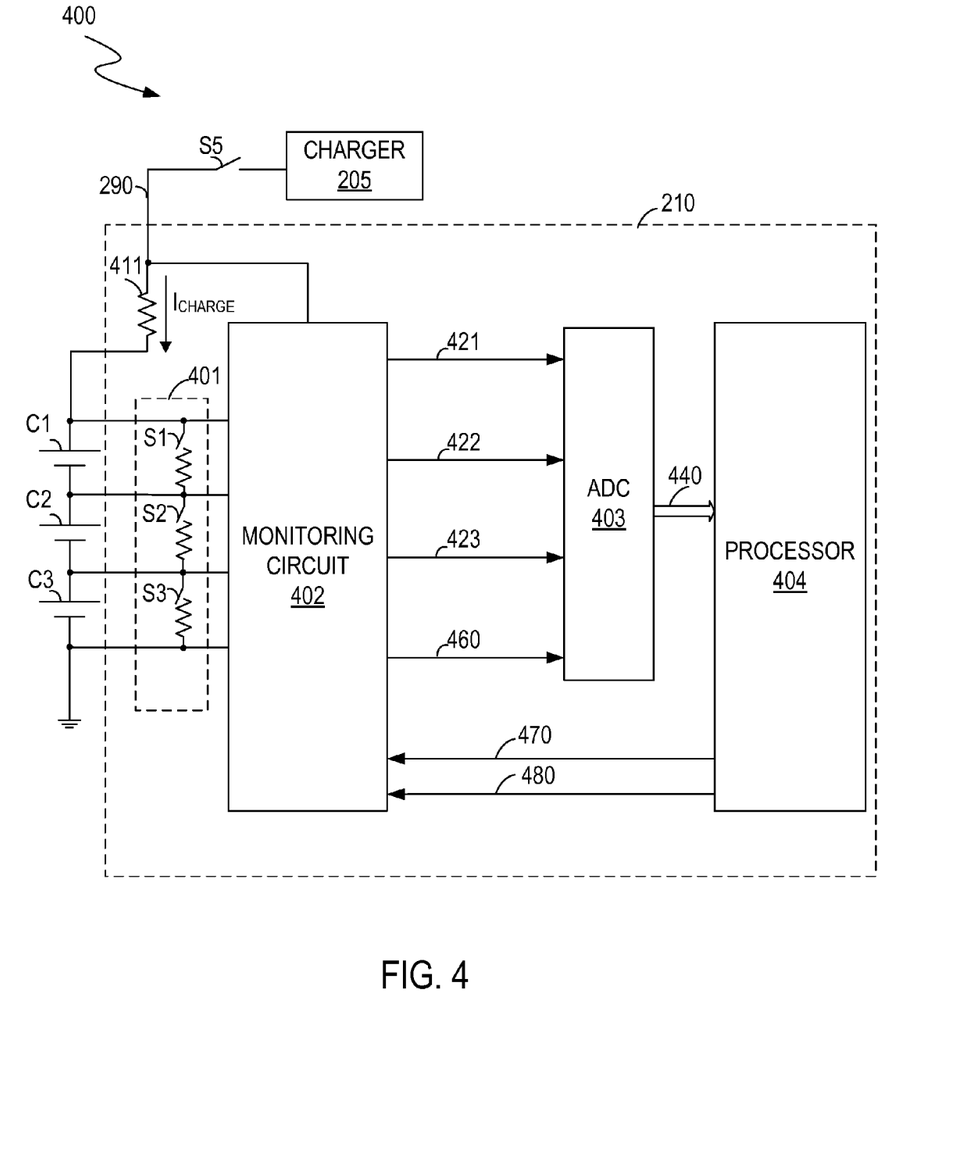
FIG. 4 illustrates a block diagram of a battery system, in an embodiment according to the present invention.

FIG. 4 illustrates a block diagram of a battery system 400, in an embodiment according to the present invention. Elements labeled the same as in FIG. 2 have similar functions. FIG. 4 is described in combination with FIG. 2 and FIG. 3.

In one embodiment, the balancing module 210 includes a resistor 411, a balancing circuit 401, a monitoring circuit 402, an analog to digital converter (ADC) 403, and a processor 404. In one embodiment, the monitoring circuit 402 monitors cell parameters (e.g. cell voltages and cell currents) for each individual cell C1 to C3, and generates monitoring signals accordingly. In one embodiment, the monitoring circuit 402 generates monitoring signals 421-423 indicating voltages of cells C1-C3. In one embodiment, the monitoring circuit 402 monitors a charging current $I_{CHARGE}$ through the cells C1-C3 via the resistor 411 and generates a monitoring signal 460 indicating the charging current. Furthermore, in one embodiment, the monitoring circuit 402 also monitors a battery temperature and capacities of cells C1-C3 and generates respective monitoring signals (not shown).

The ADC 403 coupled to the monitoring circuit 402 converts the monitoring signals 421-423 and 460 to digital signals 440. The processor 404 coupled to the ADC 403 receives the digital signals 440 to obtain the status information of the individual cell C1-C3.

The processor 404 executes machine-executable instructions to control the battery cells C1-C3 according to the digital signals 440. More specifically, in one embodiment, the processor 404 determines whether an undesirable condition of the battery cells C1-C3 (e.g. an over-voltage condition, an over-current condition, or an under-voltage condition) is present according to the status of the individual cell C1-C3. If the battery cells C1-C3 experience an undesirable condition, the processor 404 controls the monitoring circuit 402 through control commands 470 to protect the cells C1-C3 from the undesirable condition.

Furthermore, the processor 404 further detects the charging current and sets the voltage threshold $V_H$ and/or $V_L$ according to the detected charging current.

More specifically, in one embodiment, the processor 404 accesses data sets indicating the voltage thresholds associated with the charging currents. For example, the current $I_{CHARGING1}$, the voltage threshold $V_{H1}$, and/or the voltage threshold $V_{L1}$ are stored as a first data set; the current $I_{CHARGING2}$, the voltage threshold $V_{H2}$, and/or the voltage threshold $V_{L2}$ are stored as a second data set; and so on. The processor 404 detects the charging current and selects a data set from the data sets according to the value of the charging current, and thus sets the voltage threshold(s) according to the selected data set. For example, when the charging current is equal to $I_{CHARGING1}$, the first data set is selected, and thus the voltage threshold $V_H$ is set as $V_{H1}$ and/or the voltage threshold $V_L$ is set as $V_{L1}$. Similarly, when the charging current is equal to $I_{CHARGING2}$, the second data set is selected, and thus the voltage threshold $V_H$ is set as $V_{H2}$ and/or the voltage threshold $V_L$ is set as $V_{L2}$.

In an alternative embodiment, each data set indicates predicted variations of a cell voltage for a corresponding battery cell that is charged by a corresponding charging current. Each data set represents a curve corresponding to a corresponding charging current, e.g., the curve 301 corresponding to current $I_{CHARGING1}$, or the curve 302 corresponding to current $I_{CHARGING2}$. The processor 404 detects the charging current and selects a data set from the data sets according to the value of the charging current. For example, when the charging current is equal to $I_{CHARGING1}$, a data set corresponding to the curve 301 is selected, and when the charging current is equal to $I_{CHARGING2}$, a data set corresponding to the curve 302 is selected. Then, the processor 404 identifies a flat voltage region of the selected curve during which an increasing rate of the cell voltage is less than a rate threshold. The processor 404 further sets the voltage threshold $V_H$ and/or the voltage threshold $V_L$ according to the flat voltage region. Specifically, the processor 404 sets the voltage threshold $V_H$ that is greater than a maximum cell voltage of a battery cell operating in the flat voltage region, and/or sets the voltage threshold $V_L$ that is less than a minimum cell voltage of a battery cell operating in the flat voltage region. For example, in curve 301, the voltage threshold $V_H$ is set as $V_{H1}$ and the voltage threshold $V_L$ is set as $V_{L1}$. Similarly, in curve 302, the voltage threshold $V_H$ is set as $V_{H2}$ and the voltage threshold $V_L$ is set as $V_{L2}$.

The voltage thresholds $V_H$ and $V_L$ are used to determine whether one or more battery cells are operating outside of a flat voltage region. The processor 404 compares a cell voltage of each battery cell C1-C3 to the voltage threshold $V_H$ and/or the voltage threshold $V_L$. In one embodiment, if at least one of cell voltages $V_{C1}$-$V_{C3}$ of the battery cells C1-C3 is greater than the voltage threshold $V_H$, the processor 404 determines that at least one of battery cells is operating outside of the flat voltage region, and starts to check whether an unbalanced condition is present. For example, if a difference between a maximum cell voltage $V_{MAX}$ and a minimum cell voltage $V_{MIN}$ is greater than the threshold $V_{DIF}$, it indicates that the battery cells C1-C3 are experiencing an unbalanced condition, and thus the processor 404 initiates a balancing operation to balance the battery cells C1-C3. In another embodiment, if at least one of the cell voltages $V_{C1}$-$V_{C3}$ is less than the voltage threshold $V_L$, then the processor 404 starts to check whether an unbalanced condition is present. In another embodiment, if at least one of cell voltages $V_{C1}$-$V_{C3}$ is greater than the voltage threshold $V_H$ or less than the second voltage threshold $V_L$, the processor 404 starts to check whether an unbalanced condition is present.

To balance the battery cells C1-C3, the processor 404 generates a balancing signal 480, in one embodiment. The monitoring circuit 402 controls the balancing circuit 401 according to the balancing signal 480. More specifically, the monitoring circuit 402 controls the switches S1, S2, and S3 based on the balancing signal 480 to enable a bleeding current (bypass current) to flow through a battery cell $C_{MAX}$ having a maximum cell voltage $V_{MAX}$ and the balancing circuit 401 so that energy stored in cell $C_{MAX}$ is consumed and the capacity is decreased. The balancing of the battery cells is terminated when the battery cells are balanced, e.g., the difference between the maximum cell voltage $V_{MAX}$ and the minimum cell voltage $V_{MIN}$ is below a threshold $V_{DIF}$.

Figure 5:
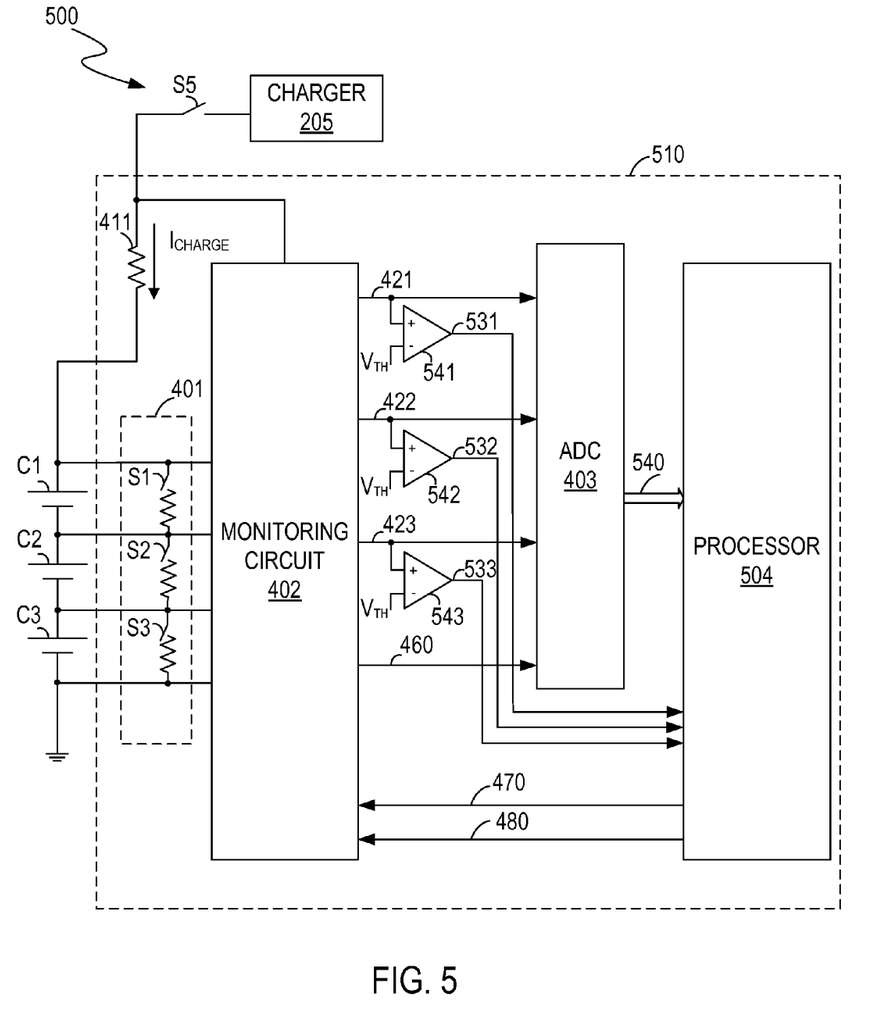
FIG. 5 illustrates another block diagram of a battery system, in an embodiment according to the present invention.

FIG. 5 illustrates a block diagram of a battery system 500, in an embodiment according to the present invention. Elements labeled the same as in FIG. 2 and FIG. 4 have similar functions. FIG. 5 is described in combination with FIG. 2, FIG. 3 and FIG. 4. The battery system 500 performs a balancing operation different from the balancing method as discussed in relation to FIG. 4.

In the example of FIG. 5, the battery system 500 includes a charger 205 and a balancing module 510. The balancing module 510 includes a resistor 411, a balancing circuit 401, a monitoring circuit 402, an analog to digital converter (ADC) 403, and a processor 404. The balancing module 510 further includes multiple comparators 541-543 that receive monitoring signals 421, 422, and 423 indicating cell voltages of the battery cells C1-C3, respectively. The comparators 541-543 respectively compare the monitoring signals 421, 422, and 423 indicating the cell voltages $V_{C1}$-$V_{C2}$ with a voltage threshold $V_{TH}$ to generate comparison signals 531, 532, and 533.

The processor 504 executes machine-executable instructions to control the cells C1-C3 according to the digital signals 540. Similar to the operation of the processor 404 in FIG. 4, the processor 504 starts to check whether the cells C1-C3 are experiencing an unbalanced condition (e.g., at least one of the cell voltages $V_{C1}$-$V_{C3}$ is greater than the voltage threshold $V_H$ or less than the voltage threshold $V_L$), and balances the cells C1-C3 if an unbalanced condition is detected. In the example of FIG. 5, the processor 504 can perform a balancing operation to adjust all the cell voltages of the cells C1-C3 to a predetermined level. More specifically, when the battery is charging, the processor 504 provides a voltage threshold $V_{TH}$. In one embodiment, the voltage threshold $V_{TH}$ is equal to or greater than the voltage threshold $V_H$. For a single battery cell, the processor 504 does not terminate the charging current for the cell until a cell voltage of the battery cell reaches the voltage threshold $V_{TH}$. In one embodiment, the processor 504 receives the comparison signals 531, 532, and 533. If a comparison signal 531, 532, or 533 indicates that a cell voltage of a corresponding battery cell C1, C2, or C3 has reached the voltage threshold $V_{TH}$, the processor 504 generates a balancing signal 480 to enable a bypass circuit associated with the corresponding battery cell. Thus, the charging of the associated battery cell is terminated, and other battery cells continue to be charged. The bypass circuit of each battery cell in the balancing circuit 401 (e.g., a switch and a resistor coupled in series) is conducted if the corresponding cell voltage reaches the voltage threshold $V_{TH}$. The balancing is stopped when all the cell voltages reach the voltage threshold $V_{TH}$. As a result, the balancing of the battery cells is achieved.

For example, if the cell voltage $V_{C1}$ of the battery cell C1 is greater than the voltage threshold $V_H$, the comparator 531 compares the cell voltage $V_{C1}$ with the voltage threshold $V_{TH}$. If the comparison signal 531 indicates that the cell voltage $V_{C1}$ has reached the voltage threshold $V_{TH}$, then the processor 504 generates a balancing signal 480 to turn on the switch S1. Thus, the charging current $I_{CHARGE}$ flows through the switch S1, and through the cells C2 and C3. Thus, the charging current $I_{CHARGE}$ only charges the battery cells C2 and C3. The charging of the battery cell C1 is terminated. Likewise, the switches S2 and S3 are turned on when corresponding cell voltages $V_{C2}$ and $V_{C3}$ reach the voltage threshold $V_{TH}$. Thus, all the cell voltages of cells C1-C3 are adjusted to the voltage threshold $V_{TH}$ such that the battery cells C1-C3 are balanced.

In an alternative embodiment, the processor 504 executes the programmed instructions to perform the comparison operations. For example, the processor 504 compares digital signals indicating the cell voltages $V_{C1}$-$V_{C3}$ with the voltage threshold $V_{TH}$. As such, the hardware comparators 541-543 can be omitted, in this embodiment.

Figure 6:
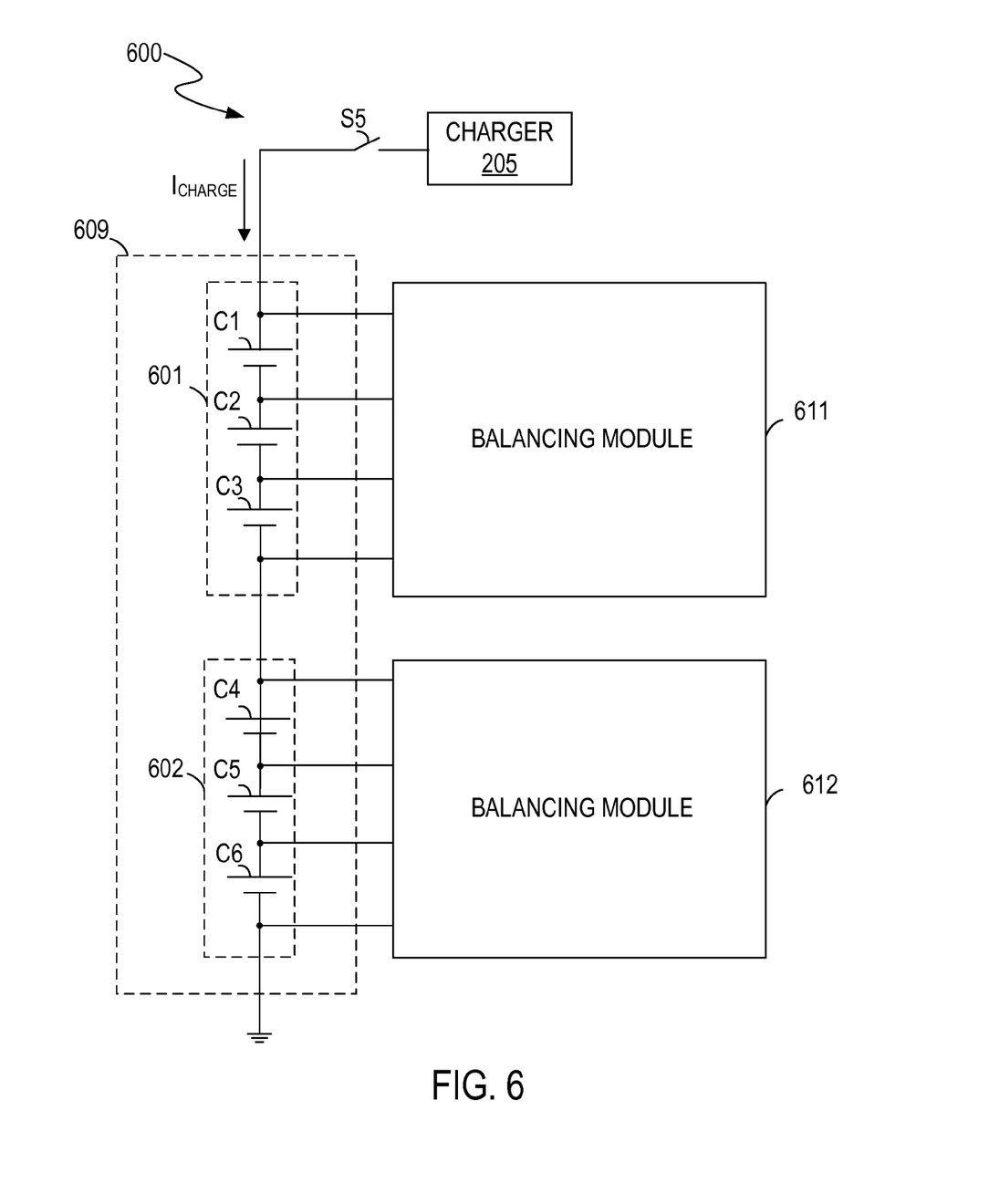
FIG. 6 illustrates another block diagram of a battery system, in an embodiment according to the present invention.

FIG. 6 illustrates a block diagram of a battery system 600, in an embodiment according to the present invention. FIG. 6 is described in combination with FIG. 2-FIG. 5. Elements labeled the same as in FIG. 2 have similar functions.

In one embodiment, the battery system 600 includes a battery pack 609 having multiple battery modules 601 and 602. Although two battery modules in the battery pack are shown in the example of FIG. 6, some other number of battery modules can be included in the battery pack. Each battery module includes a predetermined number of battery cells. For example, the battery module 601 includes battery cells C1-C3, and the battery module 602 includes battery cells C4-C6.

The battery modules 601 and 602 are coupled to the balancing modules 611 and 612, respectively. The balancing modules 611 and 612 have configurations similar to that of the balancing module 510 shown in FIG. 5. If an unbalanced condition is experienced, each cell voltage of the battery cells C1-06 is adjusted to the voltage threshold $V_{TH}$. In some embodiments, the battery module 601 and the balancing module 611 are placed in a battery group, and the battery module 602 and the balancing module 612 are placed in another battery group. Since each cell voltage is adjusted to $V_{TH}$, the battery cells in different battery groups are also balanced.

Figure 7:
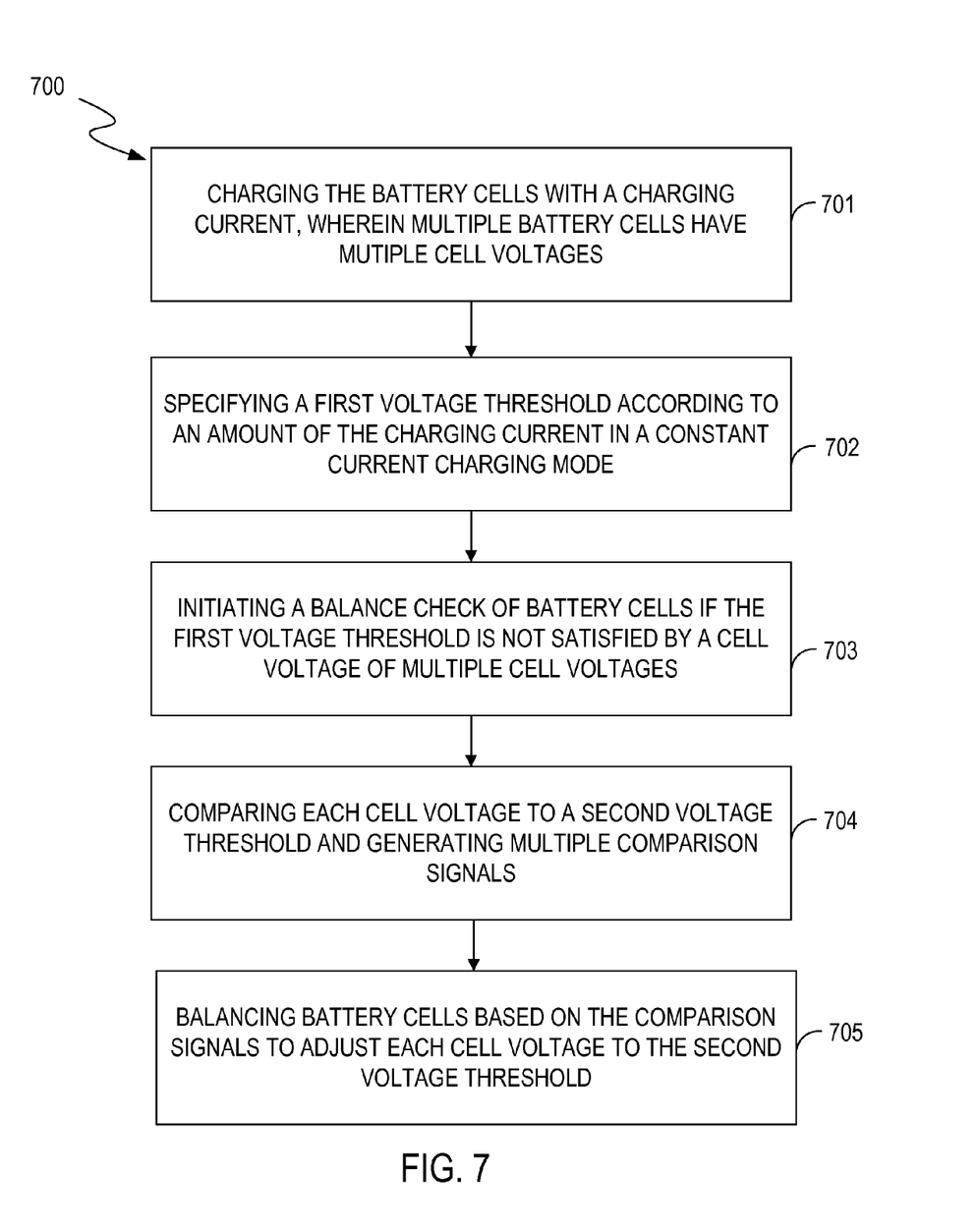
FIG. 7 illustrates a flowchart of operations performed by a battery balancing system, in an embodiment according to the present invention.

FIG. 7 illustrates a flowchart 700 of operations performed by a battery balancing system, e.g. the battery system 200, 400, 500 or 600, in an embodiment according to the present invention. FIG. 7 is described in combination with FIG. 2-FIG. 6. Although specific steps are disclosed in FIG. 7, such steps are examples. That is, the present invention is well suited to performing various other steps or variations of the steps recited in FIG. 7.

In block 701, battery cells, e.g., cells C1-C3, are charged by a charging current, e.g., the charging current $I_{CHARGE}$, and have respective cell voltages, e.g., $V_{C1}$-$V_{C3}$.

In block 702, a first voltage threshold, e.g., the voltage threshold $V_H$, or the voltage threshold $V_L$, is specified according to an amount of the charging current in a constant current charging mode.

In block 703, a balance check of the battery cells is initiated if the first threshold is not satisfied by a cell voltage of multiple cell voltages. In one embodiment, a balance check of the battery cells is initiated when a cell voltage of multiple cell voltages is greater than the voltage threshold $V_H$. In one embodiment, a balance check of the battery cells is initiated when a cell voltage of multiple cell voltage is less than the voltage threshold $V_L$. In one embodiment, a balance check of the battery cells is initiated when a cell voltage of multiple cell voltages is greater than the voltage threshold $V_H$ or less than the voltage threshold $V_L$. The voltage thresholds $V_H$ and $V_L$ are provided by a processor, e.g., the processor 404 or 504, according to the charging current.

In block 704, each cell voltage is compared to a second voltage threshold, e.g., the voltage threshold $V_{TH}$, and multiple comparison signals, e.g., the comparison signals 531-533, are generated accordingly.

In block 705, the battery cells are balanced to adjust each cell voltage to the second voltage threshold based on the comparison signals.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A battery system comprising:
a plurality of battery cells having a plurality of cell voltages; and
a balancing module coupled to said plurality of battery cells and configured to specify a first voltage threshold and a second voltage threshold less than said first voltage threshold according to an amount of a charging current supplied to said battery cells in a constant current charging mode, determine whether a battery cell of said battery cells operates outside of a voltage range, said voltage range ranging from said second voltage threshold to said first voltage threshold and comprising a flat voltage region determined by said amount of said charging current, by comparing a cell voltage of said battery cell with said first and second voltage thresholds, perform balancing of said battery cells if said balancing module determines that said battery cell operates outside of said voltage range, and disable balancing of said battery cells if said balancing module determines that said battery cells operate in said voltage range, wherein an increasing rate of said cell voltage when said battery cell operates in said flat voltage region is less than an increasing rate of said cell voltage when said battery cell operates outside of said flat voltage region.

2. The battery system as claimed in claim 1, wherein said balancing module comprises:
a processor configured to set said first voltage threshold according to a data set selected from a plurality of data sets indicating a plurality of voltage thresholds associated with a plurality of currents, said data set associated with a current equal to said charging current.

3. The battery system as claimed in claim 1, wherein said balancing module comprises:
a processor configured to access a data set indicating predicted variations of said cell voltage for said battery cell that is charged by said charging current, identify in said data set said flat voltage region, and set said first and second voltage thresholds according to said flat voltage region.

4. The battery system as claimed in claim 3, wherein said processor sets said first voltage threshold to be greater than a maximum cell voltage of said battery cell operating in said flat voltage region.

5. The battery system as claimed in claim 3, wherein said processor sets said second voltage threshold to be less than a minimum cell voltage of said battery cell operating in said flat voltage region.

6. The battery system as claimed in claim 1, wherein said balancing module comprises:
a processor configured to access a plurality of data sets associated with a plurality of currents, wherein each of said data sets indicates predicted variations of a voltage for a corresponding battery cell that is charged by an associated current, wherein said processor is further configured to select a data set from said data sets, said data set associated with a current equal to said charging current, identify in said data set said flat voltage region, and set said first and second voltage thresholds according to said flat voltage region.

7. The battery system as claimed in claim 1, wherein said balancing module comprises:
a plurality of comparators configured to compare each cell voltage of said plurality of cell voltages to a third voltage threshold and generate a plurality of comparison signals; and
a processor coupled to said comparators and configured to balance said battery cells based on said comparison signals to adjust each cell voltage to said third voltage threshold.

8. A method for charging a plurality of battery cells, said method comprising:
charging said battery cells with a charging current, wherein said plurality of battery cells have a plurality of cell voltages;
specifying a first voltage threshold and a second voltage threshold less than said first voltage threshold according to an amount of said charging current in a constant current charging mode;
determining whether a battery cell of said battery cells operates outside of a voltage range, said voltage range ranging from said second voltage threshold to said first voltage threshold and comprising a flat voltage region determined by said amount of said charging current, by comparing a cell voltage of said battery cell with said first and second voltage thresholds;
balancing said battery cells if it is determined that said battery cell operates outside of said voltage range; and disabling balancing of said battery cells if it is determined that said battery cells operate in said voltage range, wherein an increasing rate of said cell voltage when said battery cell operates in said flat voltage region is less than an increasing rate of said cell voltage when said battery cell operates outside of said flat voltage region.

9. The method as claimed in claim 8, further comprising:

accessing a plurality of data sets indicating a plurality of voltage thresholds associated with a plurality of currents;

selecting a data set from said plurality of data sets, said data set associated with a current equal to said charging current; and setting said first voltage threshold according to said data set.

10. The method as claimed in claim 8, further comprising:

accessing a data set indicating predicted variations of said cell voltage for said battery cell that is charged by said charging current;

identifying in said data set said flat voltage region; and setting said first and second voltage thresholds according to said flat voltage region.

11. The method as claimed in claim 10, further comprising:

setting said first voltage threshold to be greater than a maximum cell voltage of said battery cell operating in said flat voltage region.

12. The method as claimed in claim 10, further comprising:

setting said second voltage threshold to be less than a minimum cell voltage of said battery cell operating in said flat voltage region.

13. The method as claimed in claim 8, further comprising:

comparing each cell voltage of said plurality of cell voltages to a third voltage threshold and generating a plurality of comparison signals; and balancing said battery cells based on said comparison signals to adjust each cell voltage to said third voltage threshold.

14. A battery system comprising:

a plurality of battery modules coupled in series, wherein each of said battery modules comprises a plurality of battery cells having a plurality of cell voltages; and a plurality of balancing modules coupled to said plurality of battery modules, wherein each balancing module is configured to specify a first voltage threshold and a second voltage threshold less than said first voltage threshold according to an amount of a charging current supplied to battery cells of a corresponding battery module of said battery modules in a constant current charging mode, determine whether a battery cell of said corresponding battery module operates outside of a voltage range, said voltage range ranging from said second voltage threshold to said first voltage threshold and comprising a flat voltage region determined by said amount of said charging current, by comparing a cell voltage of said battery cell with said first and second voltage thresholds, perform balancing of said battery cells of said corresponding battery module if said balancing module determines that said battery cell operates outside of said voltage range, and disable balancing of said battery cells of said corresponding battery module if said balancing module determines that said battery cells of said corresponding battery module operate in said voltage range, wherein an increasing rate of said cell voltage when said battery cell operates in said flat voltage region is less than an increasing rate of said cell voltage when said battery cell operates outside of said flat voltage region.

15. The battery system as claimed in claim 14, wherein said balancing module comprises:

a plurality of comparators, coupled to said battery cells of said corresponding battery module, configured to compare each cell voltage of said battery cells of said corresponding battery module to a third voltage threshold, generate a plurality of comparison signals, and balance said battery cells of said corresponding battery module by adjusting each cell voltage to said third voltage threshold according to said comparison signals.

16. The battery system as claimed in claim 1, wherein said first voltage threshold is greater than a maximum voltage of said battery cell operating in said flat voltage region, and wherein said balancing module determines that said battery cell operates outside of said voltage range if said cell voltage is greater than said first voltage threshold.

17. The battery system as claimed in claim 1, wherein said second voltage threshold is less than a minimum voltage of said battery cell operating in said flat voltage region, and wherein said balancing module determines that said battery cell operates outside of said voltage range if said cell voltage is less than said second voltage threshold.

18. The battery system as claimed in claim 8, wherein said determining comprises:

determining that said battery cell operates outside of said voltage range if said cell voltage is greater than said first voltage threshold, wherein said first voltage threshold is greater than a maximum cell voltage of said battery cell operating in said flat voltage region.

19. The battery system as claimed in claim 8, wherein said determining comprises:

determining that said battery cell operates outside of said voltage range if said cell voltage is less than said second voltage threshold, wherein said second voltage threshold is less than a minimum cell voltage of said battery cell operating in said flat voltage region.

20. The battery system as claimed in claim 14, wherein said first voltage threshold is greater than a maximum voltage of said battery cell operating in said flat voltage region, and wherein said balancing module determines that said battery cell operates outside of said voltage range if said cell voltage is greater than said first voltage threshold.

21. The battery system as claimed in claim 14, wherein said second voltage threshold is less than a minimum voltage of said battery cell operating in said flat voltage region, and wherein said balancing module determines that said battery cell operates outside of said voltage range if said cell voltage is less than said second voltage threshold.

* * * * *